United States Patent
Hayashi et al.

(10) Patent No.: US 9,399,966 B2
(45) Date of Patent: Jul. 26, 2016

(54) INTERNAL COMBUSTION ENGINE CONTROLLER FOR SETTING IDLE SPEED AND VEHICLE MOUNTING THE SAME

(75) Inventors: Kenji Hayashi, Okazaki (JP); Takumi Anzawa, Okazaki (JP); Eiji Fukushiro, Tokai (JP); Katsuhiko Yamaguchi, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 740 days.

(21) Appl. No.: 13/402,201

(22) Filed: Feb. 22, 2012

(65) Prior Publication Data
US 2012/0247424 A1   Oct. 4, 2012

(30) Foreign Application Priority Data

Mar. 31, 2011   (JP) .................... 2011-078881

(51) Int. Cl.
| | |
|---|---|
| F02D 41/08 | (2006.01) |
| B60K 6/445 | (2007.10) |
| B60W 10/06 | (2006.01) |
| B60W 10/08 | (2006.01) |
| B60W 30/18 | (2012.01) |

(52) U.S. Cl.
CPC .............. *F02D 41/086* (2013.01); *B60K 6/445* (2013.01); *B60W 10/06* (2013.01); *B60W 10/08* (2013.01); *B60W 20/15* (2016.01); *B60W 30/18054* (2013.01); *B60W 2510/0676* (2013.01); *B60W 2530/14* (2013.01); *B60W 2550/12* (2013.01); *B60W 2710/065* (2013.01); *F02D 2200/021* (2013.01); *F02D 2200/0414* (2013.01); *F02D 2200/501* (2013.01); *Y02T 10/6239* (2013.01); *Y02T 10/6286* (2013.01)

(58) Field of Classification Search
CPC .............. B60W 10/08; B60W 20/108; B60W 2550/12; B60W 2710/065; B60W 30/18054; B60W 20/40; B60W 10/06; F02D 2200/021; F02D 2200/0414; F02D 2200/501; F02D 41/086; Y02T 10/6286
USPC ........ 123/339.1–339.24; 180/65.28; 701/111, 701/113
See application file for complete search history.

(56) References Cited

U.S. PATENT DOCUMENTS 5,784,878 A * 7/1998 Kato ...................... F01N 3/2013
                                                            123/339.18
5,826,671 A * 10/1998 Nakae et al. ............. 180/65.235

(Continued)

FOREIGN PATENT DOCUMENTS

JP      61272443 A  * 12/1986  .............. F02D 41/16
JP      62043327 A  *  2/1987  .............. B60K 41/16

(Continued)

*Primary Examiner* — Hung Q Nguyen
*Assistant Examiner* — Carl Staubach
(74) *Attorney, Agent, or Firm* — Dinsmore & Shohl LLP (57) ABSTRACT

An ECU for controlling an engine counts an unused time TIM of engine in a low-temperature environment. If the unused time TIM is shorter than a predetermined reference value, the ECU sets idle speed immediately after start of operation of the engine to a first idle speed, and if the unused time TIM is longer than the reference value, sets the idle speed to a second idle speed higher than the first idle speed. If duration of the second idle speed exceeds a reference period determined by state of driving of the vehicle, the ECU sets the idle speed to be lower than the second idle speed. In this manner, increased vibration in idling operation in a low-temperature environment can be prevented.

10 Claims, 8 Drawing Sheets

(56) References Cited

U.S. PATENT DOCUMENTS

| | | | |
|---|---|---|---|
| 5,909,720 A * | 6/1999 | Yamaoka et al. | 123/179.3 |
| 6,009,852 A * | 1/2000 | Akabori et al. | 123/339.19 |
| 8,868,320 B2 * | 10/2014 | Anzawa | F02D 17/04 |
| | | | 123/179.4 |
| 9,228,514 B2 * | 1/2016 | Hayashi | F02D 29/02 |
| 2002/0059916 A1 * | 5/2002 | Min | 123/339.22 |
| 2003/0145825 A1 * | 8/2003 | Janic et al. | 123/339.19 |
| 2004/0181353 A1 | 9/2004 | Doelker | |
| 2005/0188953 A1 * | 9/2005 | Ishikawa et al. | 123/339.11 |
| 2010/0048353 A1 * | 2/2010 | Iwase et al. | 477/167 |
| 2012/0253633 A1 * | 10/2012 | Anzawa | 701/102 |
| 2014/0014065 A1 * | 1/2014 | Hayashi et al. | 123/339.1 |

FOREIGN PATENT DOCUMENTS

| | | |
|---|---|---|
| JP | 2004535525 A | 11/2004 |
| JP | 2005023838 A | 1/2005 |
| JP | 2006152877 A | 6/2006 |
| JP | 2007118728 A | 5/2007 |
| JP | 2009228538 A | 10/2009 |

* cited by examiner

INTERNAL COMBUSTION ENGINE CONTROLLER FOR SETTING IDLE SPEED AND VEHICLE MOUNTING THE SAME

CROSS REFERENCE TO RELATED APPLICATIONS

This nonprovisional application claims priority to Japanese Patent Application No. 2011-078881 filed with the Japan Patent Office on Mar. 31, 2011, the entire contents of which are hereby incorporated by reference.

BACKGROUND OF THE INVENTION

1. Field of the Invention

The present invention relates to a controller for internal combustion engine and a vehicle mounting the controller. More specifically, the present invention relates to control of idle speed setting of an internal combustion engine.

2. Description of the Background Art

In an internal combustion engine, engine speed in a self-sustained operation with driving power not transmitted to a load after engine start, that is, the engine speed in idle operation or idling (hereinafter also referred to as "idle speed") should desirably be as low as possible while allowing self-sustained operation, in order to reduce fuel consumption.

While the engine is in operation, engine operation causes vibration. In order to reduce vibration during idle operation, the idle speed is set to be higher than the speed that causes resonance in driving power transmission system including the engine (hereinafter also referred to as "resonant speed").

Japanese Patent Laying-Open No. 2006-152877 (Patent Document 1) discloses, in a hybrid vehicle having a mounted engine cranked by a starter motor, a configuration in which, if there is a possibility that engine speed at the time of cranking becomes equal to the resonant speed of driving power transmission system as the increase of engine speed is curbed during engine cranking, the motor is driven to attain engine speed lower than the resonant speed.

According to the configuration disclosed in Japanese Patent Laying-Open No. 2006-152877 (Patent Document 1), even if there is a possibility that the engine speed becomes equal to the resonant speed because of decrease in motor output resulting from increased friction torque or decrease of battery output at the time of cranking for engine start operation, resonance in the driving power transmission system can be prevented.

Generally, the engine idle speed is set to a value different from the speed (resonant speed) corresponding to the resonant frequency of the driving power transmission system to which vibration from the engine propagates, in order to reduce vibration during idle operation.

It is noted, however, that the resonant speed of driving power transmission system changes if the vehicle is kept in a low-temperature environment (for example, lower than −15° C.) with the engine stopped, for example, in cold climates. Therefore, if the vehicle is kept in a low-temperature environment with its engine stopped, the resonant speed of driving power transmission system comes closer to the idle speed, possibly increasing vibration in the idle operation.

SUMMARY OF THE INVENTION

The present invention was made to solve such a problem and its object is to prevent increase in vibration during idle operation, if the engine is kept stopped in a low-temperature environment.

In short, the present invention provides a controller for an internal combustion engine, the controller counting unused time of the internal combustion engine, setting idle speed of the internal combustion engine to a first idle speed if the unused time is short, setting the idle speed of the internal combustion engine to a second idle speed if the unused time is long, and setting the idle speed smaller than the second idle speed if duration of the second idle speed exceeds a reference period.

Preferably, the controller sets the idle speed of the internal combustion engine to the first idle speed if the unused time is shorter than a predetermined reference value, and sets the idle speed of the internal combustion engine to the second idle speed if the unused time is longer than the reference value. The second idle speed is made higher than the first idle speed.

Preferably, the controller changes length of the reference period in accordance with state of driving of the internal combustion engine, when the idle speed is set to the second idle speed.

Preferably, the internal combustion engine is mounted on a vehicle. The state of driving of the internal combustion engine includes running speed of the vehicle. If the running speed is high, the controller makes the length of the reference period shorter than if the running speed is low, when the idle speed is set to the second idle speed.

Preferably, the state of driving of the internal combustion engine includes magnitude of load driven by the internal combustion engine. If the load is large, the controller makes the length of the reference period shorter than if the load is small, when the idle speed is set to the second idle speed.

Preferably, the internal combustion engine is mounted on a vehicle. The state of driving of the internal combustion engine includes magnitude of acceleration of the vehicle. If the acceleration is large, the controller makes the length of the reference period shorter than if the acceleration is small, when the idle speed is set to the second idle speed.

Preferably, the controller sets the idle speed to the second idle speed if a value related to air temperature before start of operation of the internal combustion engine is lower than a threshold value and the unused time is longer than the reference value.

Preferably, the internal combustion engine is mounted on a vehicle using a fixing member. Resonant frequency of driving power transmission system including the internal combustion engine has a characteristic that the resonant frequency becomes higher as temperature of the fixing member decreases.

Preferably, the controller gradually decreases the idle speed over time from the second idle speed if duration of the second idle speed exceeds the reference time period.

Preferably, the internal combustion engine is used with a driving electric motor. The controller controls the internal combustion engine and the driving electric motor such that requested driving power is generated from the internal combustion engine and from the driving electric motor, and sets, when the idle speed is set to the second idle speed, an output of the internal combustion engine to a value different from when the idle speed is set to the first idle speed.

Preferably, the controller counts, as the unused time, time period in which the internal combustion engine is stopped with a value related to air temperature being lower than a threshold value.

According to another aspect, the present invention provides a vehicle, including an internal combustion engine and a controller for controlling the internal combustion engine. The controller counts unused time of the internal combustion engine, sets idle speed of the internal combustion engine to a first idle speed if the unused time is short, sets the idle speed of the internal combustion engine to a second idle speed if the unused time is long, and sets the idle speed smaller than the second idle speed if duration of the second idle speed exceeds a reference period.

Preferably, the vehicle further includes an electric motor. The vehicle runs using at least one of driving power generated by the internal combustion engine and driving power generated by the electric motor. The controller controls distribution of driving power generated by the internal combustion engine and driving power generated by the electric motor so that requested driving power is output. The controller changes the driving power generated by the internal combustion engine in response to a change in the idle speed.

Preferably, the internal combustion engine is mounted on a vehicle using a fixing member. Resonant frequency of driving power transmission system including the internal combustion engine has a characteristic that the resonant frequency becomes higher as temperature of the fixing member decreases.

By the present invention, it is possible to prevent increase in vibration during idle operation, even if the engine is kept stopped in a low-temperature environment.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described in detail with reference to the figures. In the figures, the same or corresponding portions are denoted by the same reference characters and description thereof will not be repeated.

[Description of Overall Vehicle Configuration]

Figure 1:
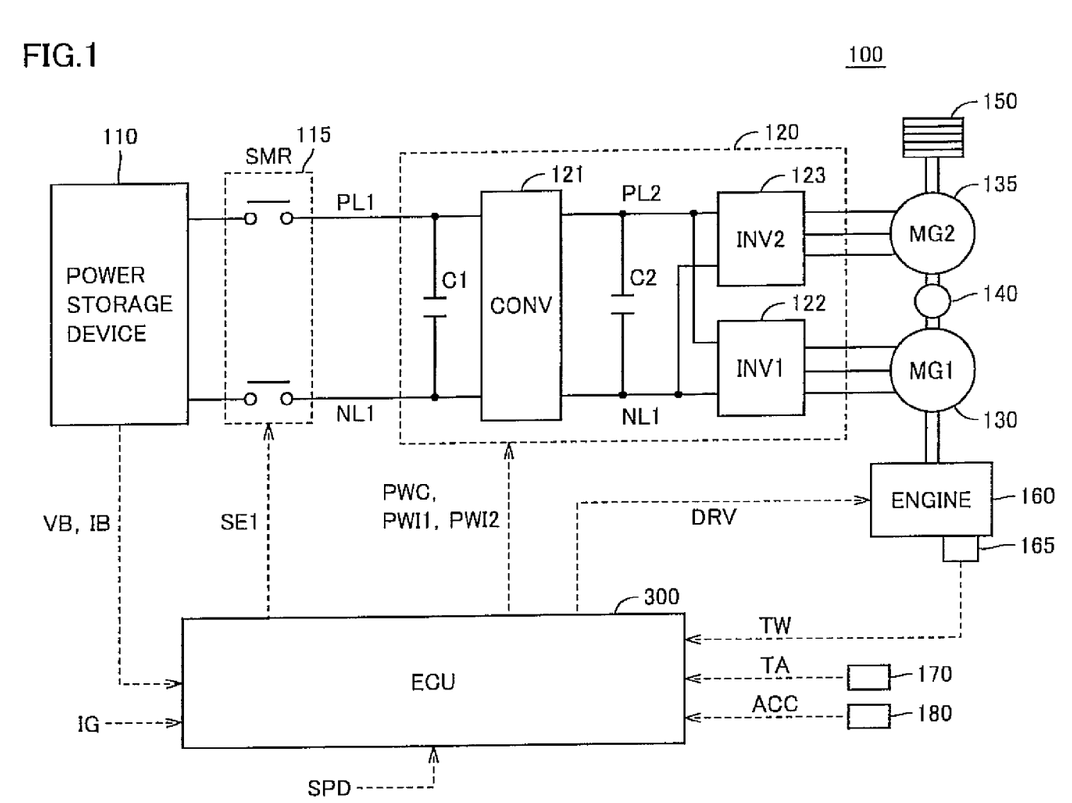
FIG. 1 is an overall block diagram of a vehicle in accordance with an embodiment of the present invention.

FIG. 1 is an overall block diagram of a vehicle 100 in accordance with an embodiment of the present invention. Referring to FIG. 1, vehicle 100 includes a power storage device 110, a system main relay (SMR) 115, a PCU (Power Control Unit) 120 as a driving device, motor generators 130 and 135, a power transmission gear 140, a driving wheel 150, an engine 160 as an internal combustion engine, and an ECU (Electronic Control Unit) 300 as a controller. PCU 120 includes a converter 121, inverters 122 and 123, and capacitors C1 and C2.

Power storage device 110 is a chargeable electric power storage element. Power storage device 110 is formed, for example, to include a secondary battery such as a lithium ion battery, a nickel hydride battery or a lead battery, or a power storage element such as electric double layer capacitor.

Power storage device 110 is connected to PCU 120 through a power line PL1 and a ground line NL1. Power storage device 110 supplies electric power for generating driving power of vehicle 100 to PCU 120. Further, power storage device 110 stores electric power generated by motor generators 130 and 135. The output of power storage device 110 is, for example, about 200V.

Relays included in SMR 115 are respectively inserted to power line PL1 and ground line NL1 connecting power storage device 110 to PCU 120 to each other. SMR 115 switches power conduction/non-conduction between power storage device 110 and PCU 120 based on a control signal SE1 from ECU 300.

Converter 121 carries out voltage conversion between power line PL1 and ground line NL1, and a power line PL2 and ground line NL1, based on a control signal PWC from ECU 300.

Inverters 122 and 123 are connected in parallel between power line PL2 and ground line NL1. Inverters 122 and 123 convert DC power supplied from converter 121 to AC power and drive motor generators 130 and 135, respectively, in accordance with control signals PWI1 and PWI2 from ECU 300, respectively.

Capacitor C1 is provided between power line PL1 and ground line NL1, and reduces voltage fluctuation between power line PL1 and ground line NL1. Capacitor C2 is provided between power line PL2 and ground line NL1, and reduces voltage fluctuation between power line PL2 and ground line NL1.

Motor generators 130 and 135 are AC rotating electrical machines and, by way of example, permanent magnet synchronous motors provided with rotors having permanent magnets embedded therein.

Output torque of motor generators 130 and 135 is transmitted through power transmission gear 140 formed to include a reduction gear and a power split device to driving wheel 150, whereby the vehicle 100 runs. At the time of regenerative braking of vehicle 100, motor generators 130 and 135 can generate electric power by the torque of driving wheel 150. The generated electric power is converted by PCU 120 to charging power for charging power storage device 110.

Further, motor generators 130 and 135 are also coupled to engine 160 through power transmission gear 140. ECU 300 operates motor generators 130 and 135 and engine 160 in a cooperative manner, whereby necessary vehicle driving power is generated. Further, motor generators 130 and 135 are capable of generating electric power by the rotation of engine 160, and using the generated electric power, power storage device 110 can be charged. In the present embodiment, it is assumed that motor generator 135 is exclusively used as an electric motor for driving wheel 150 and motor generator 130 is exclusively used as a generator driven by engine 160.

Engine 160 has its rotation speed, valve open/close timing and fuel flow controlled by a control signal DRV from ECU 300, and generates driving power to run the vehicle.

FIG. 1 shows, as an example, a configuration of a hybrid vehicle that runs using at least one of driving power from engine 160 and driving power from motor generators 130 and 135. The present embodiment, however, is applicable to any configuration that at least includes an engine. Therefore, the vehicle may include engine only and not a motor generator. If the vehicle is a hybrid vehicle, the vehicle may have one motor generator, or two or more motor generators.

Engine 160 is provided with a temperature sensor 165 for detecting temperature of cooling water for cooling engine 160. Temperature sensor 165 outputs a signal related to detected cooling water temperature TW to ECU 300.

Vehicle 100 is further provided with a temperature sensor 170 for detecting outside air temperature, and a vibration sensor 180 for detecting vehicle body vibration. Temperature sensor 170 outputs a signal TA related to the detected outside air temperature to ECU 300. Vibration sensor 180 is, for example, an acceleration sensor, and it outputs a signal related to detected acceleration of vehicle vibration ACC to ECU 300.

ECU 300 includes a CPU (Central Processing Unit), a storage device and an input/output buffer, all not shown in FIG. 1, receives signal inputs from various sensors, outputs control signals to various devices, and controls vehicle 100 and various devices. Such control may be realized not only by software processing but also by dedicated hardware processing (electronic circuitry).

Based on detected values of voltage VB and current IB from a voltage sensor and a current sensor (both not shown) provided for power storage device 110, ECU 300 calculates state of charge (SOC) of power storage device 110. Further, ECU 300 receives a signal related to vehicle speed SPD from a speed sensor, not shown.

ECU 300 receives an ignition signal IG for starting the vehicle, input by a user operation. In response to the reception of ignition signal IG, ECU 300 closes SMR 115, so that the electric power from power storage device 110 is transmitted to PCU 120. Alternatively, or in addition, ECU 300 outputs a control signal DRV to start engine 160.

Though the configuration shown in FIG. 1 is provided with one ECU 300 as a controller, a separate controller may be provided for each function or for each device as an object of control, such as a controller for PCU 120 and a controller for power storage device 110.

Embodiment 1

Generally, the engine idle speed is set to a value different from the speed (resonant speed) corresponding to the resonant frequency of the driving power transmission system to which vibration from the engine propagates, in order to reduce vibration during idle operation.

It is noted, however, that the resonant speed of driving power transmission system changes if the vehicle is kept in a low-temperature environment (for example, lower than −15° C.) with the engine stopped, for example, in cold climates. Therefore, if the vehicle is kept in a low-temperature environment with its engine stopped, the resonant speed of driving power transmission system comes closer to the idle speed, possibly increasing vibration in the idle operation.

When an engine is mounted on a vehicle body, it is a general practice to insert an elastic fixing member (mount), such as a rubber member, to prevent direct transmission of vibration caused when the engine is driven to the vehicle body.

The resonant frequency of driving power transmission system including the engine changes depending on the modulus of elasticity of the mount used for installation. By way of example, if the vehicle is kept in a very low-temperature environment with the engine stopped for a long period of time in a cold region, depending on the characteristics of the mount, the mount may harden, leading to a change in resonant speed of driving power transmission system. It is known that when the mount hardens, that is, when the modulus of elasticity becomes smaller, the resonant frequency generally becomes higher. Therefore, if the vehicle is left in a low-temperature environment for a long time, the resonant speed of driving power transmission system possibly comes close to the idle speed, and the vibration during idle operation would undesirably be stronger.

Therefore, in Embodiment 1, idle speed changing control is executed in which the idle speed is changed in accordance with the time how long the vehicle is left unused in the low-temperature environment with the engine stopped, so as to prevent resonance generated in driving power transmission system during the idle operation.

Figure 2:
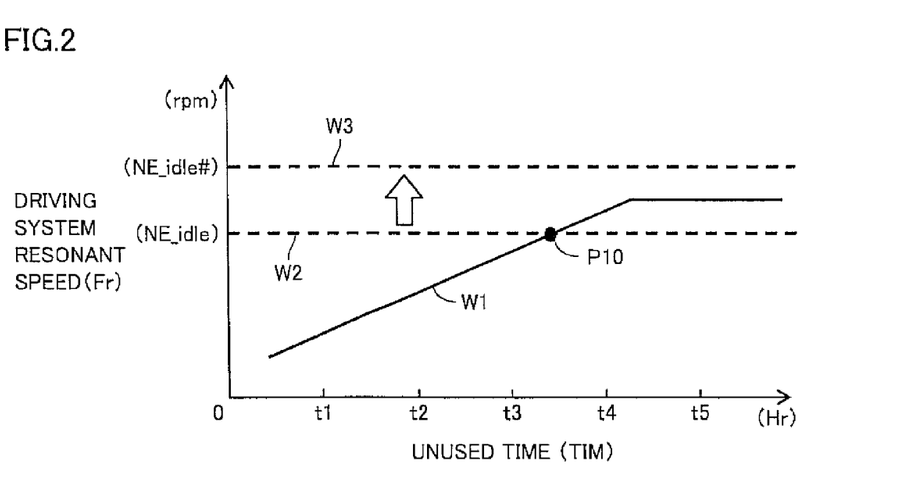
FIG. 2 outlines the idle speed changing control in accordance with Embodiment 1.

FIG. 2 outlines the idle speed changing control in accordance with Embodiment 1. The abscissa of FIG. 2 indicates the time period in which the engine is kept stopped in a low-temperature environment (hereinafter also referred to as "unused time") TIM, and the ordinate represents resonant speed Fr at which the driving power transmission system including the engine resonates.

Referring to FIGS. 1 and 2, in the very low-temperature environment, because of hardening of mount, resonant speed Fr of driving power transmission system becomes higher as the unused time TIM becomes longer, as represented by a solid line W1 in FIG. 2, and saturated near a certain resonant speed.

Assume that resonant speed Fr attains to or near the point P10 that is equal to the idle speed NE_idle (for example, 1300 rpm) of engine 160 at normal temperature (dotted line W2 of FIG. 2). If engine 160 is started and idled in this state, it is possible, particularly immediately after the start of operation, that the driving power transmission system resonates, because of the vibration generated by engine 160.

In Embodiment 1, assuming that the mount has such a characteristic as shown in FIG. 2, in response to the unused time reaching t3 (for example, 72 hours) at which resonant speed Fr comes closer to the rotation speed corresponding to idle speed NE_idle, the set value of idle speed is changed to an idle speed NE_idle# (for example, 1500 rpm) higher than idle speed NE_idle at the normal temperature, as represented by a dotted line W3 in FIG. 2. As a result, the idle speed can be set away from the resonant speed of driving power transmission system and, therefore, resonance of driving power transmission system can be prevented.

If the idle speed is changed to idle speed NE_idle# as shown in FIG. 2 as the vehicle is kept unused for a long period of time in low-temperature environment, and this state with higher idle speed is kept for a long time, fuel efficiency would be lower. Therefore, when the resonant speed of driving power transmission system returns to the state of normal temperature, it is desirable to return the idle speed to NE_idle at the normal temperature as soon as possible, from the viewpoint of preventing fuel inefficiency.

The timing for returning to the speed NE_idle at the normal temperature is basically determined based on the time period the mount takes to recover from the hardened state, by the vibration and heat generated by combustion of engine 160, assuming that the idle state continues after the start of engine operation.

If the vehicle starts running or the engine is operated with high load after the start of engine operation, however, the engine temperature increases in a shorter time period than in the idle state, or the vibration energy resulting from engine operation or vehicle running is given to the mount, so that the hardened state of mount is more easily returns to the original state (softens). Therefore, in such a situation, the idle speed at normal temperature can be resumed earlier than when the idle state continues. In this manner, decrease of fuel efficiency caused when the increased idle speed is kept excessively long can be prevented.

Figure 3:
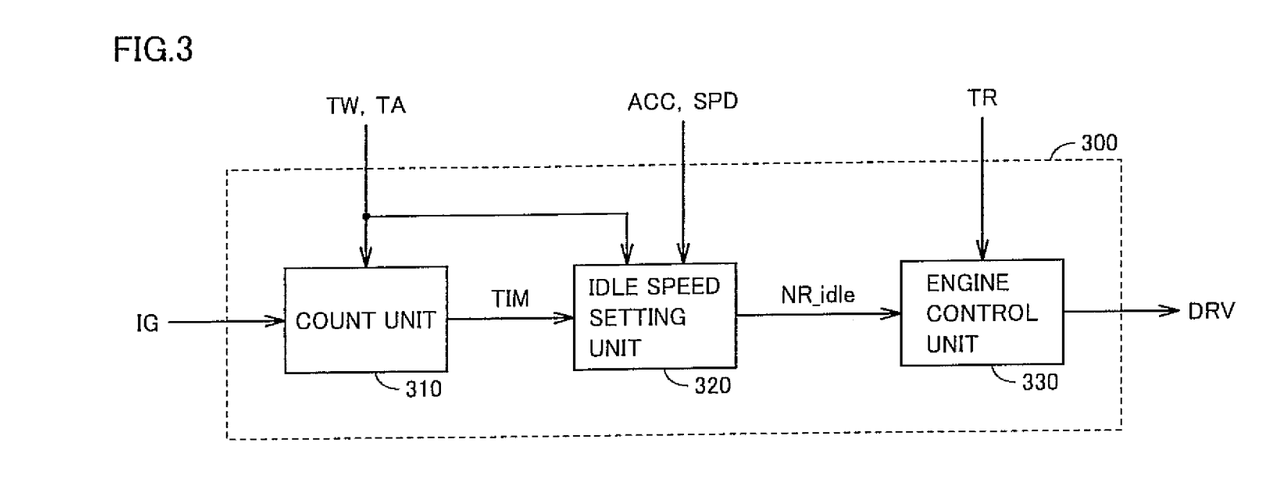
FIG. 3 is a functional block diagram illustrating the idle speed changing control executed by an ECU in Embodiment 1.

FIG. 3 is a functional block diagram illustrating the idle speed changing control executed by ECU 300 in Embodiment 1. The functional blocks shown in the functional block diagram of FIG. 3 are each realized by hardware or software processing at ECU 300.

Referring to FIGS. 1 and 3, ECU 300 includes a count unit 310, an idle speed setting unit 320, and an engine control unit 330.

Count unit 310 receives ignition signal IG by a user operation, and water temperature TW and outside air temperature TA from temperature sensors 165 and 170. Based on these pieces of information, count unit 310 calculates the unused time TIM in which the engine is kept not operated in a low-temperature environment. Count unit 310 outputs the calculated unused time TIM to idle speed setting unit 320.

Idle speed setting unit 320 receives the unused time TIM from count unit 310, water temperature TW and outside air temperature TA from temperature sensors 165 and 170, acceleration of vibration ACC from vibration sensor 180, and vehicle speed SPD from a speed sensor, not shown. Based on these pieces of information, idle speed setting unit 320 sets the reference value NR_idle of idle speed during idle operation, as described with reference to FIG. 2, and outputs the set reference value NR_idle to engine control unit 330.

Further, based on the state of the vehicle determined from the pieces of information described above, idle speed setting unit 320 determines the timing for returning the setting of idle speed from NE_idle# to the speed NE_idle at the normal temperature.

Engine control unit 330 receives the reference value NR_idle of idle speed from idle speed setting unit 320. At the time of idle operation, engine control unit 330 generates control signal DRV such that the speed of engine 160 follows the reference value NR_idle, and thereby controls engine 160. Further, when the vehicle is running, engine control unit 330 generates control signal DRV such that torque TR determined, for example, by an operation of accelerator pedal by the user is output, and thereby controls engine 160.

Figure 4:
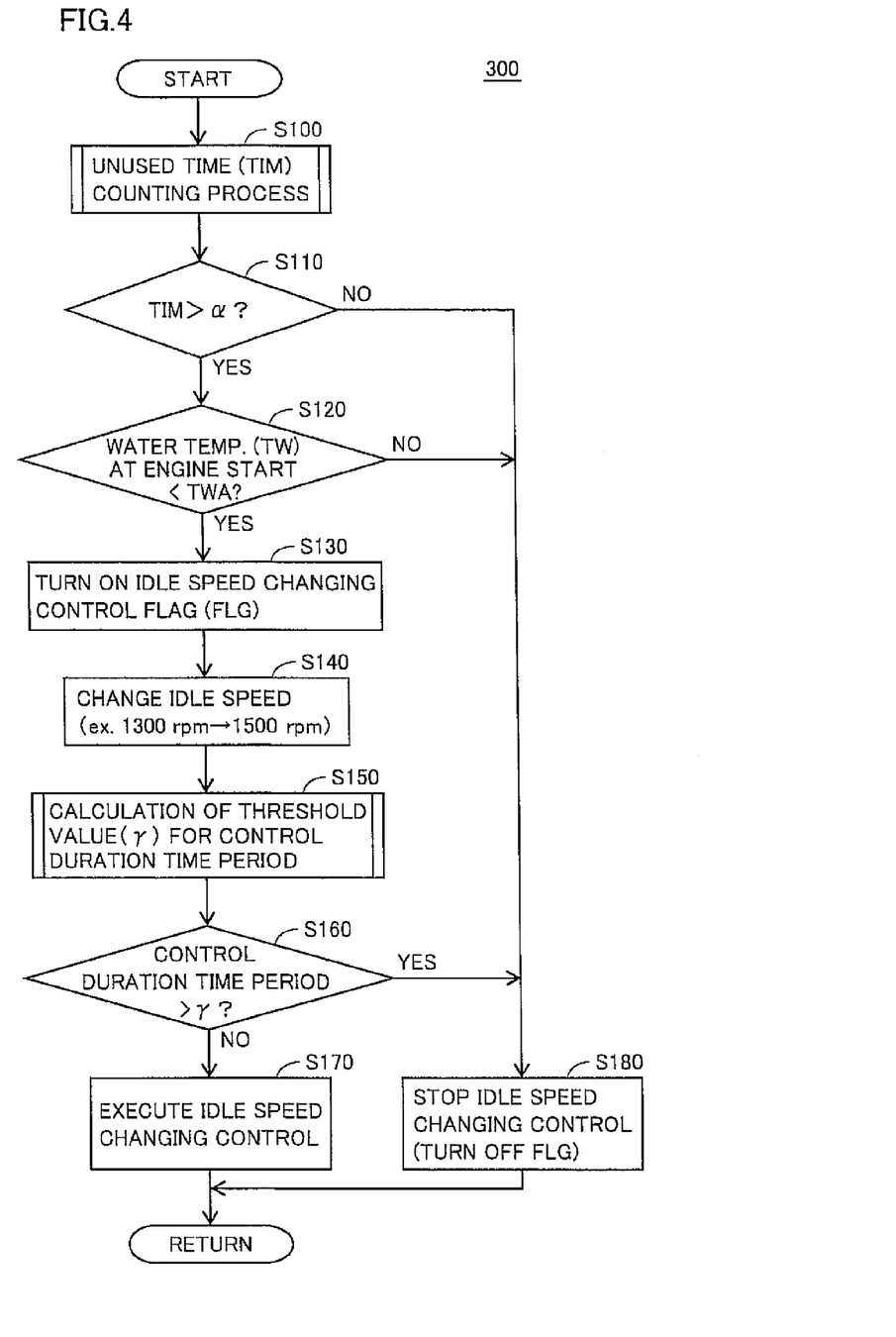
FIG. 4 is a flowchart representing details of the process for idle speed changing control executed by the ECU in Embodiment 1.

FIG. 4 is a flowchart representing details of the process for idle speed changing control executed by ECU 300 in Embodiment 1. The flowcharts of FIG. 4 and FIGS. 5, 7 and 10 which will be described later are realized by ECU 300 executing programs stored in advance and called from the main routine periodically at a prescribed interval. Some or all of the process steps may be realized by dedicated hardware (electronic circuitry).

Referring to FIGS. 1 and 4, at step (hereinafter "step" will be simply denoted by "S") 100, ECU 300 counts the unused time TIM of the vehicle in a low-temperature environment. Details of the counting process at S100 will be described later with reference to FIG. 5.

Next, at S110, ECU 300 determines whether or not the unused time TIM calculated at S100 is larger than a predetermined reference value α.

If the unused time TIM is equal to or smaller than α (NO at S110), ECU 300 determines that the resonant speed of driving power transmission system has not yet reached near the idle speed. Then, ECU 300 causes the process to proceed to S180, at which change of idle speed is not executed, and the process ends.

If the unused time TIM is larger than the reference value α (YES at S110), the process proceeds to S120, at which whether or not the cooling water temperature TW at the start of engine 160 is lower than a predetermined threshold value TWA is determined. This is to determine whether or not the vehicle has been in a low-temperature environment at the time of starting engine 160. Though cooling water temperature TW reflecting the actual temperature of engine 160 is used as the index indicating that the vehicle is in the low-temperature environment at S120, other signal such as the outside air temperature TA from temperature sensor 170 may be used for the determination.

If the cooling water temperature TW is equal to or higher than the threshold value TWA (NO at S120), ECU 300 determines, for example, that it is daytime and outside air temperature is high, it is likely that the hardened state of mount has been released, and the resonant speed of driving power transmission system has not reached near the idle speed. Then, ECU 300 causes the process to proceed to S180, at which change of idle speed is not executed, and the process ends.

If the cooling water temperature TW is lower than the threshold value TWA (YES at S120), ECU 300 determines that the vehicle is in a low-temperature environment, and it is highly likely that the resonant speed of driving power transmission system has reached near the idle speed. Then, at S130, ECU 300 sets on a control flag FLG of idle speed changing control, and at S140, changes the reference value NR_idle of idle speed to rotation speed NE_idle# (for example, 1500 rpm) higher than the rotation speed NE_idle (for example, 1300 rpm) at a normal temperature. The rotation speed NE_idle# after change may be set to a value smaller than the rotation speed NE_idle at the normal temperature provided that the resonant speed of driving power transmission system can be avoided and stable operation of engine 160 is ensured.

Then, at S150, ECU 300 sets a threshold value γ for a period in which idle speed changing control is executed, that is, control duration time period, based on the driving state of the vehicle. The process for setting the duration threshold value will be described later with reference to FIGS. 6 and 7.

Thereafter, at S160, ECU 300 determines whether or not the control duration time period is longer than the reference value γ set at S150.

If the control duration time period is equal to or shorter than the reference value γ (NO at S160), ECU 300 determines that the softening of mount caused by the vibration energy generated by idling of engine 160 is insufficient. Therefore, the process proceeds to S170, at which ECU 300 continues the idle speed changing control and maintains the idle speed NE_idle# higher than the speed at the normal temperature.

If the control duration time period is longer than the reference value γ (YES at S160), ECU 300 determines that hardened mount supporting engine 160 has been softened by the heat energy and vibration energy generated by the idling of engine 160. Specifically, ECU 300 determines that the resonant speed of driving power transmission system has been reduced and away from the idle speed NE_idle at the normal temperature. Then, the process proceeds to S180, at which ECU 300 stops idle speed changing control, returns the idle speed to idle speed NE_idle at the normal temperature, and sets off the control flag FLG.

In the example shown in FIG. 4, if the water temperature TW at the start of engine operation is lower than the threshold value TWA, the idle speed changing control is executed (S120). The process of step S120 is not limiting, and the idle speed changing control may be executed if the unused time TIM is longer than the reference value $\alpha$, regardless of the water temperature TW at the start of engine operation.

Figure 5:
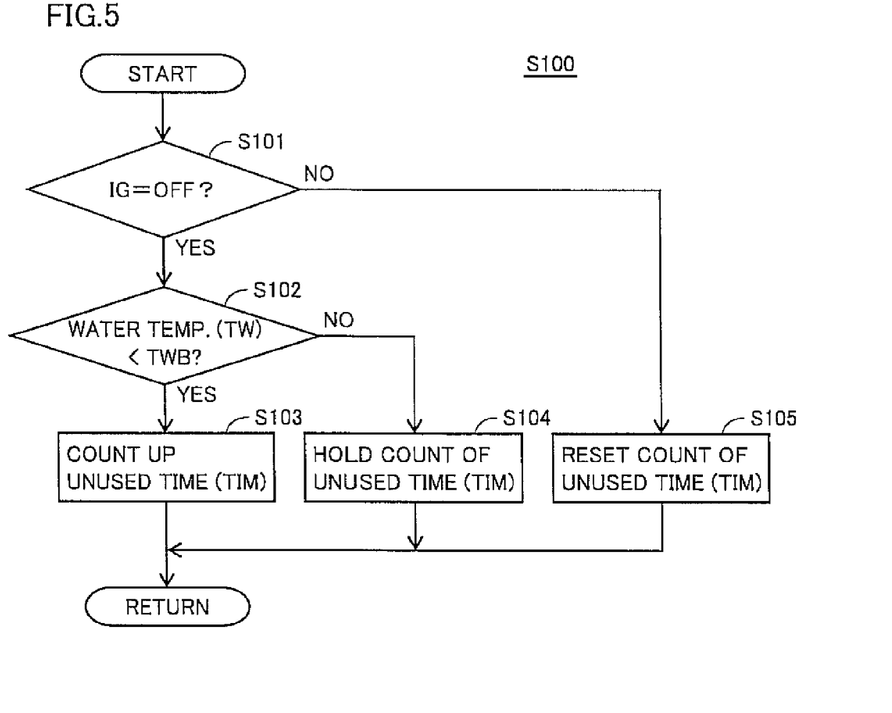
FIG. 5 is a flowchart representing details of the process for counting the time how long the vehicle is left unused, at step S100 of FIG. 4.

FIG. 5 is a flowchart representing details of the process for counting the unused time at step S100 of FIG. 4.

Referring to FIGS. 1 and 5, at S101, ECU 300 determines whether or not the ignition signal IG given by a user operation is off.

If the ignition signal IG is off (YES at S101), at S102, ECU 300 determines whether or not the cooling water temperature TW is lower than a threshold value TWB, that is, whether or not the current state is in the low temperature environment. The signal used for determination at S120 may be other signal that allows determination of low-temperature environment, as described with reference to S120 above. Further, the threshold value TWB used here may or may not be the same value as the threshold value TWA used at S120.

If the cooling water temperature TW is lower than the threshold value TWB (YES at S102), the process proceeds to S103 at which ECU 300 determines that the vehicle is in the low-temperature environment and counts up the unused time TIM.

On the other hand, if the cooling water temperature TW is not lower than the threshold value TWB (NO at S102), ECU 300 determines that the present state is not in a low-temperature environment, and the process proceeds to S104, at which unused time TIM is not counted-up but held at the current count value.

If the ignition signal IG is on (NO at S101), it means that the engine operation has started and, therefore, ECU 300 causes the process to proceed to S105, at which the value of unused time TIM is stored and the count value of counter is reset. ECU 300 executes subsequent processes using the stored value of unused time TIM.

It is noted that, in a hybrid vehicle, even if the ignition signal IG is turned on, the operation of engine 160 does not always start. In such a case, even if the ignition signal IG is on, the mount may remain hardened.

From this reason, in a hybrid vehicle, the process of S101 may be executed with the determination based on the control signal DRV to engine 160. Even if operation of engine 160 is not actually started, the hardened mount may have been softened by vibration generated as the vehicle runs, if the vehicle has been running for some time using the driving power from motor generator. Therefore, if the determination is made based on the control signal DRV to engine 160, it is preferred to determine whether the unused time is to be reset or not additionally taking into consideration the actual running state of the vehicle.

In the flowchart of FIG. 5, the unused time TIM is counted up only when the water temperature TW is lower than the threshold value TWB. The process of step S102, however, is not limiting, and the unused time TIM may be counted up if the ignition signal IG is off, regardless of the water temperature TW.

Next, the details of threshold value setting process for the control duration time period at step S150 of FIG. 4 will be described.

Figure 6:
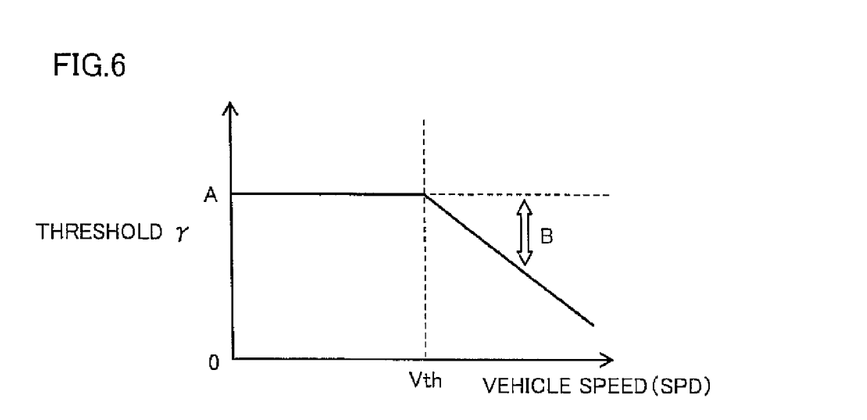
FIG. 6 illustrates a threshold value for control duration time period.

FIG. 6 illustrates the outline of the method of setting threshold value $\gamma$ for the control duration time period. In FIG. 6, the abscissa represents vehicle speed SPD and the ordinate indicates the threshold value $\gamma$ of control duration time period.

Referring to FIG. 6, if the engine 160 starts its operation and the vehicle 100 starts running as described above, the vibration and temperature of engine itself increase as the engine speed increases, and the vibration derived from road condition is transmitted to the mount and, therefore, the hardened mount tends to be more easily softened, than when the idling operation continues.

Therefore, until the vehicle speed SPD of vehicle 100 reaches a prescribed reference speed Vth, control duration time period A (for example, 15 minutes) when idling operation only is done is set as the threshold value $\gamma$, and if the vehicle speed SPD exceeds the prescribed reference speed Vth, the threshold value $\gamma=(A-B)$ is set such that the control duration time period becomes shorter, with a value B to be subtracted gradually made larger in accordance with the vehicle speed SPD.

Though FIG. 6 shows an example in which the threshold value $\gamma$ decreases gradually in accordance with the vehicle speed SPD once the vehicle speed SPD becomes higher than a prescribed reference speed Vth, a fixed control duration time period shorter than the control duration time period A may be set as the threshold value $\gamma$ (that is, the value B to be subtracted may be a fixed value). In such a case, though fine adjustment in accordance with the vehicle speed SPD is impossible, simpler control can advantageously be realized.

Though FIG. 6 shows an example using only the vehicle speed SPD of vehicle 100 as the driving state, the threshold value $\gamma$ may be set taking into consideration the duration of vehicle speed SPD and change history of vehicle speed SPD, in addition to the value of vehicle speed SPD. Alternatively, the threshold value $\gamma$ may be variably set using magnitude of load on engine 160, vehicle acceleration, running distance and/or accumulated value of air used for combustion as indexes, in place of vehicle speed SPD.

Figure 7:
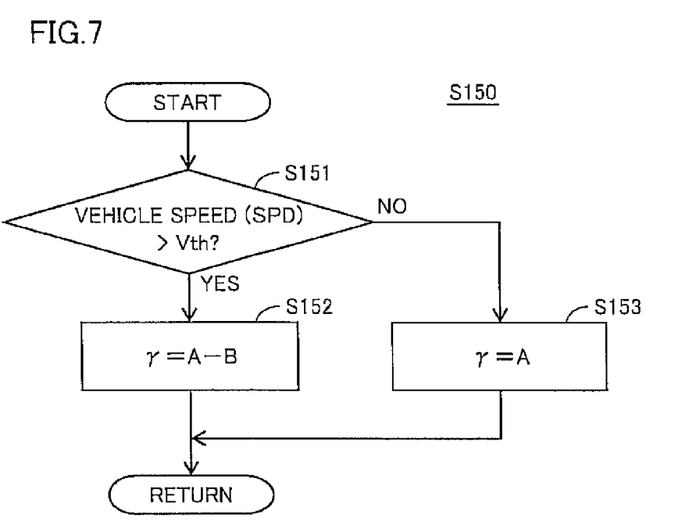
FIG. 7 is a flowchart representing details of the process for determining threshold value for control duration time period, at step S150 of FIG. 4.

FIG. 7 is a flowchart representing details of the process for determining threshold value for the control duration time period at step S150 of FIG. 4.

Referring to FIGS. 1 and 7, at S151, ECU 300 determines whether or not the vehicle speed SPD from a speed sensor, not shown, is higher than the reference speed Vth.

If the vehicle speed SPD is equal to or lower than the reference speed Vth (NO at S151), the process proceeds to S153, at which ECU 300 sets the threshold value $\gamma$ of control duration time period to the initial value A, which is the control duration time period when engine 160 continues idling operation only. Then, the process of ECU 300 proceeds to S160 of FIG. 4.

If the vehicle speed SPD is higher than the reference speed Vth (YES at S151), the process proceeds to S152, at which ECU 300 adopts as the threshold value $\gamma$ the value obtained by subtracting the value B, which gradually increases as the vehicle speed SPD increases, from initial value A. Then, the process of ECU 300 proceeds to step S160 of FIG. 4.

Resonance during idle operation caused by increased resonant speed of driving power transmission system, derived from hardening of the mount supporting the engine when the vehicle is kept in a low-temperature environment for a long period of time, can be curbed by the control in accordance with the processes shown in FIGS. 4, 5 and 7. Further, expecting vibration, the idle speed is changed. Therefore, possibility of vibration caused by resonance can be reduced. Further, the time period in which the idle speed is changed is adjusted in accordance with the driving state of the vehicle after the start of engine operation, so that the state with increased idle speed is not kept longer than necessary. Therefore, wasteful fuel consumption can be avoided and good fuel efficiency can be maintained.

Embodiment 2

In Embodiment 1, a configuration has been described in which the idle speed changing control is stopped and the idle speed at the normal temperature is resumed, if the engine operation starts, the idle speed changing control starts and thereafter the duration of control reaches the threshold value γ.

In such a configuration, however, when the idle speed changing control ends, the set value of idle speed decreases abruptly and, therefore, the engine speed during running changes abruptly in a hybrid vehicle such as shown in FIG. 1, possibly causing change in state of vibration of the vehicle.

Further, in a hybrid vehicle, if distribution of driving power to the engine is changed in accordance with the change in idle speed to prevent decrease in overall efficiency, abrupt change in engine speed may possibly result in a torque shock.

Therefore, in Embodiment 2, in the idle speed changing control described in Embodiment 1, when the control duration time period reaches the threshold value γ and the set value is returned to the idle speed at the normal temperature, the set value is lowered gradually with time, to prevent abrupt change of engine speed.

Figure 8:
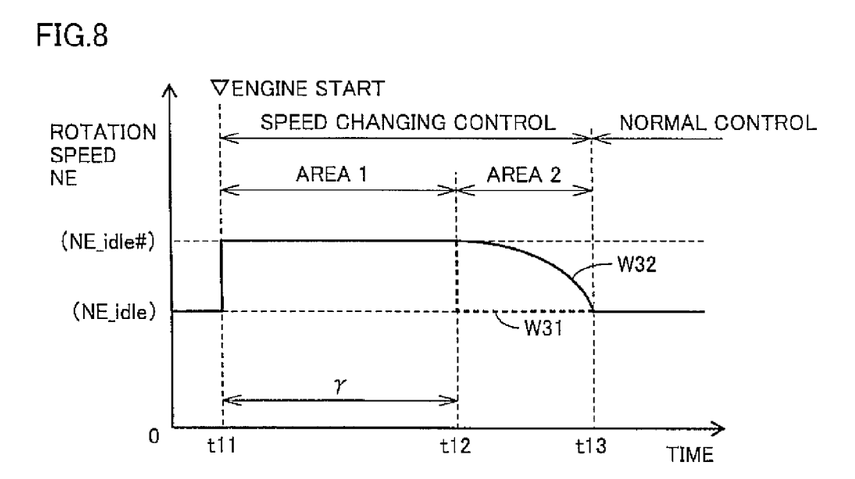
FIG. 8 illustrates the process for lowering idle speed at the end of idle speed changing control in accordance with Embodiment 2.

FIG. 8 illustrates the process for lowering the idle speed at the end of idle speed changing control in accordance with Embodiment 2. In FIG. 8, the abscissa represents time and the ordinate represents engine speed.

Referring to FIGS. 1 and 8, when engine 160 is started (time t11) after vehicle 100 has been kept in a low-temperature environment for a prescribed time period, the idle speed is set to the speed NE_idle# higher than the speed NE_idle at the normal temperature. In Embodiment 1, at time t12 when the control duration time period reaches the threshold value γ as represented by a dotted line W31 shown in FIG. 8, the set value of idle speed is returned to the speed NE_idle at the normal temperature.

On the other hand, in the idle speed changing control in accordance with Embodiment 2, the set value of idle speed is gradually decreased to speed NE_idle at the normal temperature from time t12 when the control duration time period reaches the threshold value γ to time t13, as represented by solid line W32.

In this manner, in the idle speed changing control, the process for decreasing the idle speed at the end of control such as represented by an area 2 in FIG. 8 is added, whereby abrupt change in engine speed at the end of idle speed changing control can be prevented.

Here, in a hybrid vehicle such as shown in FIG. 1, such a control that engine command power and target torque of motor generator are determined based on a torque requested by the driver is possible. Therefore, if the idle speed changing control in accordance with the present embodiment is applied to a hybrid vehicle, it is preferred to change the engine command power in accordance with the change in idle speed, so that the optimal engine efficiency is realized.

Figure 9:
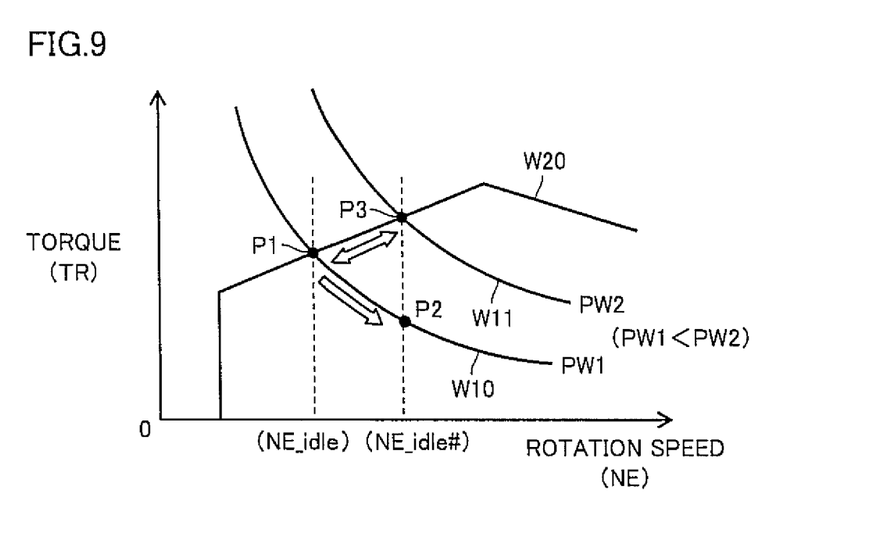
FIG. 9 outlines the method of setting engine speed and torque, when the idle speed changing control is applied to a hybrid vehicle, in accordance with Embodiment 2.

FIG. 9 illustrates the outline of the method of setting engine speed and torque, when the idle speed changing control is applied to a hybrid vehicle. In FIG. 9, the abscissa represents engine speed NE and the ordinate represents torque TR to the engine.

Referring to FIGS. 1 and 9, a line W20 in FIG. 9 represents a relation between rotation speed NE and torque TR that attains the optimal efficiency, based on the characteristics of engine 160.

Assuming that the idle speed at normal temperature is speed NE_idle, the torque TR is set such that the operation point P1 is attained from the operation line W20 mentioned above. The relation between speed NE and torque TR to attain requested power PW1 to reach the point P1 is represented by a line W10 of FIG. 9.

Here, in the idle speed changing control, if only the engine speed NE is simply changed to speed NE_idle# and the distribution of requested power to engine 160 is the same, the torque TR changes along the line W10, and the engine 160 is driven at the operation point P2.

The operation point P2 is not on the operation line W20 representing the optimal efficiency, meaning that the efficiency of engine 160 is lower.

Therefore, when the idle speed is to be changed in a hybrid vehicle such as shown in FIG. 1, the distribution of requested power to engine 160 is controlled such that the operation point after change is on the operation line W20. In the example of FIG. 9, the requested power to engine 160 is changed from PW1 to PW2 so that engine 160 is driven at point P3, at which the speed attains NE_idle#, on operation line W20.

At the end of idle speed changing control also, the speed NE and torque TR are controlled such that the operation point gradually changes from point P3 to P1 along operation line W20. In this manner, abrupt change in engine speed and torque at the end of idle speed changing control can be prevented without lowering engine efficiency, in a hybrid vehicle.

Figure 10:
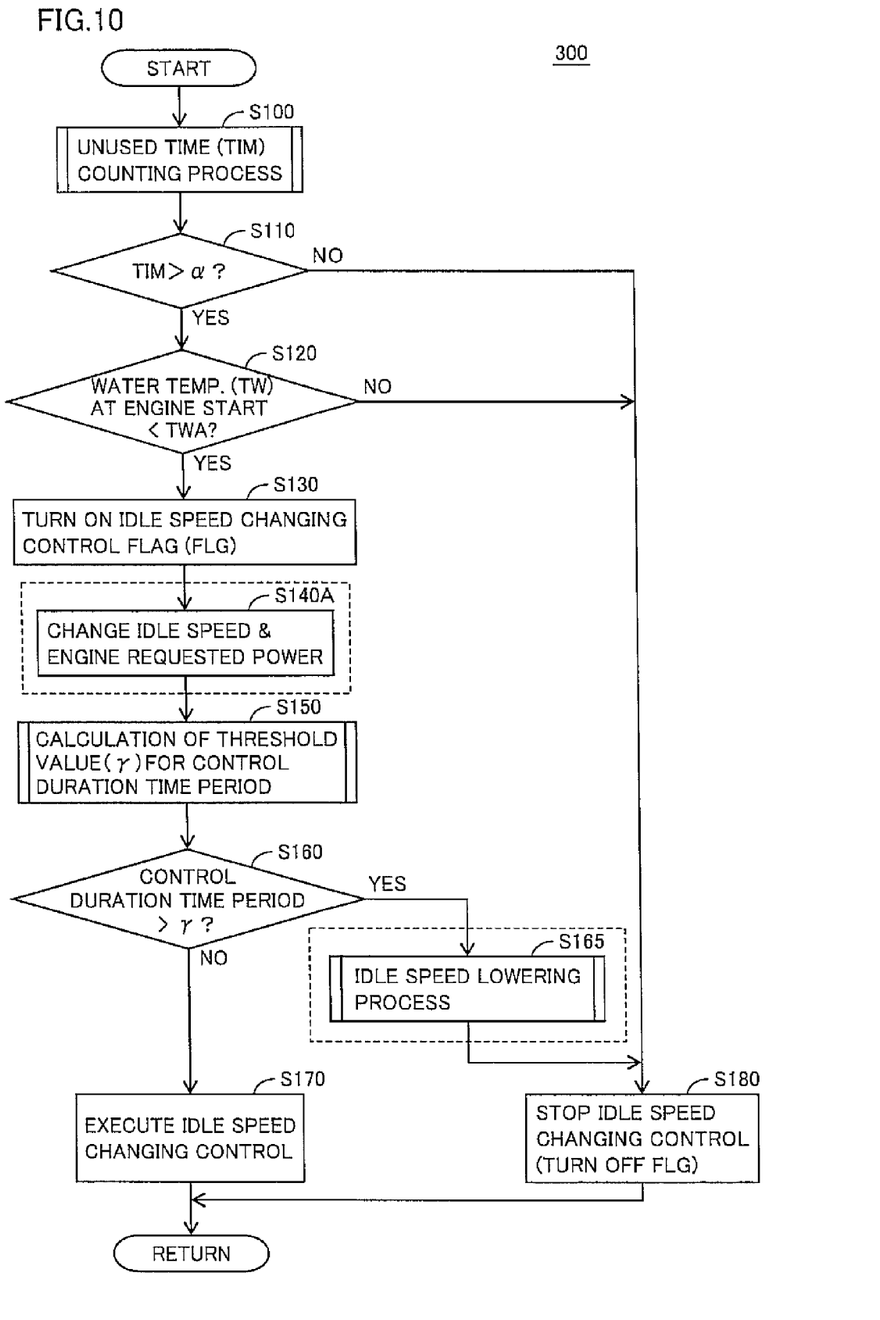
FIG. 10 is a flowchart representing details of the process for idle speed changing control executed by the ECU in Embodiment 2.

FIG. 10 is a flowchart representing the idle speed changing control executed by ECU 300 in accordance with Embodiment 2. In FIG. 10, step 140 of the flowchart shown in FIG. 4 of Embodiment 1 is replaced by S140A, and S165 is newly added. Description of steps of FIG. 10 which are the same as those of FIG. 4 will not be repeated.

Referring to FIGS. 1 and 10, if it is determined that unused time TIM is longer than the predetermined reference value α (YES at S110) and the cooling water temperature TW at the start of engine operation is lower than the threshold value TWA (YES at S120), the process proceeds to S130 at which ECU 300 sets on the idle speed changing control flag FLG.

Then, the process proceeds to S140A, at which ECU 300 sets the idle speed using such a map as shown in FIG. 2. For a hybrid vehicle, a map such as shown in FIG. 9 is additionally used, so that the requested power that attains the optimal efficiency of engine 160 at the set changed idle speed is determined, and distribution of driving power to engine 160 and motor generators 130 and 135 is set.

Thereafter, at S150, ECU 300 sets the threshold value γ of control duration time period in accordance with the driving state of the vehicle as described with reference to FIGS. 6 and 7. Then, at S160, ECU 300 determines whether or not the duration time period of idle speed changing control is longer than the threshold value γ.

If the control duration time period is equal to or shorter than the threshold value γ (NO at S160), the process proceeds to S170 and ECU 300 continues the idle speed changing control.

On the other hand, if the control duration time period is longer than the threshold value γ (YES at S160), the process proceeds to S165. At S165, ECU 300 executes the lowering process of lowering the set value of idle speed gradually with time as described with reference to FIG. 8. In case of a hybrid vehicle, at S165, the requested power is changed along the operation line that attains optimal efficiency of engine 160 as the idle speed is changed. When the idle speed is returned to the idle speed at normal temperature, the process proceeds to S180, at which ECU 300 ends the idle speed changing control.

By the control in accordance with the process described above, abrupt change in engine speed at the end of idle speed changing control can be prevented.

Though an example in which the resonant speed of driving power transmission system changes because of hardening of mount has been described above, the present invention is similarly applicable if the resonant speed of driving power transmission system changes when the vehicle is kept in a low-temperature environment, apart from the mount factor.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A controller for an internal combustion engine, said controller counting unused time of said internal combustion engine, setting idle speed of said internal combustion engine after engine start to a first idle speed if said unused time is short, setting the idle speed of said internal combustion engine after engine start to a second idle speed if said unused time is long, and setting said idle speed smaller than said second idle speed if duration of said second idle speed exceeds a reference period, said controller changing length of said reference period in accordance with state of driving of said internal combustion engine, when said idle speed is set to said second idle speed.

2. The controller for an internal combustion engine according to claim 1, said controller setting the idle speed of said internal combustion engine after engine start to said first idle speed if said unused time is shorter than a predetermined reference value, and setting the idle speed of said internal combustion engine after engine start to said second idle speed if said unused time is longer than said reference value, wherein said second idle speed is made higher than said first idle speed.

3. The controller for an internal combustion engine according to claim 1, wherein said internal combustion engine is mounted on a vehicle;
the state of driving of said internal combustion engine includes running speed of said vehicle; and
if said running speed is high, said controller makes the length of said reference period shorter than if said running speed is low, when said idle speed is set to said second idle speed.

4. The controller for an internal combustion engine according to claim 1, wherein the state of driving of said internal combustion engine includes magnitude of load driven by said internal combustion engine; wherein if said load is large, said controller makes the length of said reference period shorter than if said load is small, when said idle speed is set to said second idle speed.

5. The controller for an internal combustion engine according to claim 1, wherein said internal combustion engine is mounted on a vehicle;
the state of driving of said internal combustion engine includes magnitude of acceleration of said vehicle; and
if said acceleration is large, said controller makes the length of said reference period shorter than if said acceleration is small, when said idle speed is set to said second idle speed.

6. The controller for an internal combustion engine according to claim 1, wherein said internal combustion engine is mounted on a vehicle using a fixing member; and
resonant frequency of driving power transmission system including said internal combustion engine has a characteristic that the frequency becomes higher as temperature of said fixing member decreases.

7. The controller for an internal combustion engine according to claim 1, said controller gradually decreasing said idle speed from said second idle speed if duration of said second idle speed exceeds said reference time period.

8. The controller for an internal combustion engine according to claim 1, wherein said internal combustion engine is used with a driving electric motor;
said controller controlling said internal combustion engine and said driving electric motor such that requested driving power is generated from said internal combustion engine and from said driving electric motor, and setting, when said idle speed is set to said second idle speed, an output of said internal combustion engine to a value different from when said idle speed is set to said first idle speed.

9. The controller for an internal combustion engine according to claim 1, said controller counting, as said unused time, time period in which said internal combustion engine is stopped with a value related to air temperature being lower than a threshold value.

10. A controller for an internal combustion engine, said controller counting unused time of said internal combustion engine, setting idle speed of said internal combustion engine after engine start to a first idle speed if said unused time is short, setting the idle speed of said internal combustion engine after engine start to a second idle speed if said unused time is long, and setting said idle speed smaller than said second idle speed if duration of said second idle speed exceeds a reference period, said controller counting, as said unused time, time period in which said internal combustion engine is stopped with a value related to air temperature being lower than a threshold value.

* * * * *